Patented Oct. 11, 1932

1,882,637

UNITED STATES PATENT OFFICE

LAMBERT D. JOHNSON AND NATHAN F. TRUE, OF EVANSVILLE, INDIANA, ASSIGNORS TO MEAD JOHNSON & COMPANY, OF EVANSVILLE, INDIANA, A CORPORATION OF INDIANA

POWDERED PROTEIN MILK AND PROCESS OF PREPARING SAME

No Drawing.  Application filed April 14, 1928. Serial No. 270,145.

This invention relates to improvements in powdered protein milk and process of preparing same.

Protein milk is a milk preparation relatively high in protein and relatively low in carbohydrate content.

It is used as a corrective diet for infants suffering from diarrhœa, and as a diet for treating cholera infantum, chronic intestinal indigestion (Celiac disease) for breast fed infants suffering from diarrhœa or colic.

Powdered protein milk as made in the past has not proven entirely satisfactory for use because it has a high bacteria count and cannot be rendered sterile by boiling, because when reliquefied and boiled it curdles to such an extent that it becomes unfit for use. A protein milk product which is not adapted to be boiled to render it sterile is not uniformly safe for infants to consume. Another objection to protein milk made by previously known processes is the darkening in color and change in taste, which has resulted when the reconstituted milk is boiled.

One object of this invention is to produce a powdered protein milk which when reconstituted with water can be boiled to render it sterile without causing coagulation of the casein in the mixture.

Another object is to produce a powdered protein milk in which the physical and chemical constituents will not be appreciably changed by boiling the solution when the powdered milk has been reconstituted with water.

Another object is to produce a powdered protein milk which, if boiled after having been reconstituted with water, will not become discolored.

In carrying out our improved process for preparing powdered protein milk which is adapted to be boiled after being reconstituted with water, we proceed as follows:—

Preferably, two-thirds of the total volume of milk to be treated is whole milk and one-third is butter milk or skim milk which has been made acid by culturing with lactic acid bacilli or by the addition of lactic acid to the skim milk.

The whole milk is treated with a curdling agent. It is either pasteurized and then cultured with lactic acid bacilli, heated to cause the curd to settle, or else to the milk is added a sufficient amount of acid or a salt such as calcium chloride to cause curdling. Rennet has also been used as a curdling agent. We prefer to first boil the milk and then treat with sufficient calcium chloride solution to cause coagulation of the casein. To four hundred gallons of whole milk, preferably five pounds of calcium chloride is used, the calcium chloride being dissolved in ten gallons of water. This solution of calcium chloride is added to the milk while the mixture is being agitated. The coagulation of the casein causes the butter fat to become included in the casein coagulant. The boiling of the milk before adding the curdling agent has the effect of producing a finer curd than if the curdling agent is added to raw or uncooked milk. The curd thus formed is allowed to settle, the clear solution or whey is drawn off, and the curd allowed to drain sufficiently to remove the excess whey and calcium chloride solution. This draining process usually continues for fifteen minutes.

The curd is now mixed with butter milk or with milk which has been made acid either by culturing or by the addition of lactic or other acid. We prefer to use skim milk to which has been added a sufficient amount of U. S. P. lactic acid to raise the acidity of the milk to approximately 0.75 per cent. To two hundred gallons of skim milk, about six quarts of the lactic acid are used.

The mixture is now run through a homogenizer at about 2000 pounds pressure for the purpose of breaking up the curd (casein and butter fat) into finely divided particles.

An important step in our improved process is now to be described. This mixture of curd and acid milk, prepared as herein described, is subjected to heat for the purpose of changing the character of the casein so that its coagulable property is largely destroyed. A further purpose of the heat treatment is to render the mixture as nearly sterile as possible. The heat may be applied by several different methods such as heating the mixture in a steam jacketed tank, injecting steam directly into the mixture in an open tank, or by injecting steam under pressure into a closed tank.

We prefer to inject steam under pressure into the mixture in a closed tank, which has at the top a vent pipe connected to a condenser and thence to a vacuum pump. The air is first exhausted from the tank holding the mixture after which the mixture is rapidly heated to boiling by injecting steam. The vacuum in the tank will, of course, be lost but the air will have been replaced by steam. This heating thus takes place in a practical absence of air, hence there is little or no oxidation to cause deterioration of the vitamins of the mixture. The exhausted steam passing through the mixture and thence through the vent pipe causes the incoming steam to agitate the mixture, thus keeping the finely divided particles of casein separated from each other.

After the heat treatment is completed, the mixture is rapidly cooled, is again homogenized at about twenty-five hundred pounds pressure and spray dried. Drying is preferably accomplished by spraying the mixture at two thousand pounds pressure into a current of heated air in a drying chamber to produce a fine powder of approximately two per cent moisture content. If the protein milk were dried in an ordinary vacuum drum drier, the particles of the dried product would be coarse and would readily settle out of the reliquefied product, which would render it unsuitable for infant feeding purposes because the particles would be too large to readily pass through the orifice of a nipple. We have found that by using a spray drier as herein described for drying the unconcentrated mixture prepared according to our method, the insoluble constituents of the reliquefied milk are carried in suspension in a very fine state. The use of a spray dryer upon the protein milk in its dilute state is an important improvement in preparing protein milk for infant feeding.

Skim milk can be used in place of whole milk in the curdling process if the total mixture be reinforced and standardized by the addition of cream, butter fat or other fat or oil to the desired fat content.

The process described has the effect of changing the character of the casein in the milk, so that boiling the reconstituted powdered protein milk for ten minutes, to render it sterile, will have no undesirable effect on the product.

The protein milk produced by our invention is a fine powder, almost white in color, having a faint yellowish tint, a faint acid smell, and a pleasant, slightly acid taste.

The approximate analysis of the finished product is:

| | Per cent |
|---|---|
| Protein | 39.00 |
| Butter fat | 27.00 |
| Lactose | 24.00 |
| Salts | 6.00 |
| Free lactic acid | 2.00 |
| Moisture | 2.00 |
| | 100.00 |

The novel quality of the product results from the fact that the insoluble constituents have been rendered non-adhering and are held in suspension in fine particles in the reconstituted milk, so that the same may be boiled without resultant coagulation of the casein.

It is characterized by the property of being boilable, when reconstituted with water, without curdling and without having its physical and chemical constituents appreciably changed.

It will be understood that the reconstituted protein milk need not be boiled before being used, but if it is thought desirable to do so, such boiling will produce none of the undesirable conditions herein referred to.

We claim as our invention.

1. An improvement in processes of preparing powdered protein milk for infant feeding purposes, which when reliquefied may be boiled without curdling which consists in treating whole milk with calcium chloride to form whey and curd, removing and draining the curd, treating skim milk with lactic acid, mixing the curd and said acidified milk together increasing the temperature of the mixture to substantially the boiling point thereof, agitating the same during said heat treatment, and spray drying the mixture.

2. An improvement in processes of preparing powdered protein milk for infant feeding purposes, which when reliquefied may be boiled without curdling which consists in treating whole milk with calcium chloride to form whey and curd, draining the curd, treating skim milk with lactic acid to increase its acidity to approximately 0.75 percent, mixing the curd with said acidified milk, subjecting the mixture to heat treatment until its coagulable property is substantially destroyed, and spray drying the mixture.

3. An improvement in processes of preparing powdered protein milk for infant feeding purposes, which when reliquefied may be boiled without curdling which consists in treating whole milk with calcium chloride to form whey and curd, draining the curd, culturing skim milk with lactic acid producing organisms to increase its acidity to approximately 0.75 percent, mixing the curd with said acidified milk, subjecting the mixture to heat treatment until the coagulable property is substantially destroyed, and spray drying the mixture.

4. The process of preparing powdered protein milk for infant feeding purposes, which when reliquefied may be boiled without curdling which consists in using about two parts of whole milk to one of skim milk, treating the whole milk with calcium chloride to form whey and curd, dreaming the curd, treating skim milk with lactic acid, mixing the curd and acidified milk together under pressure, subjecting the mixture to heat treatment, and homogenizing and spray drying the mixture.

5. An improvement in processes of preparing powdered protein milk for infant feeding purposes, which when reliquefied may be boiled without curdling, which consists in mixing curd with acid milk, placing same in a vacuum tank, heating and agitating the mixture by injecting steam into the mixture in a practical absence of air, until its coagulable property is substantially destroyed, rapidly cooling the mixture and spray drying the product.

6. An improvement in processes of preparing protein powdered milk for infant feeding purposes, which when reliquefied may be boiled without curdling, which consists in increasing the temperature of a mixture of curd and acid milk to substantially the boiling point of the milk, until the coagulable properties thereof have been destroyed, agitating the same during said heat treatment, and then spray drying the product in its dilute form.

7. An improvement in processes of preparing protein powdered milk for infant feeding purposes, which when reliquefied may be boiled without curdling, which consists in injecting steam directly into a mixture of curd and acid milk to rapidly raise the temperature thereof to substantially the boiling point and simultaneously agitating the milk, then rapidly cooling the same, and spray drying the product in its dilute form.

8. An improvement in processes of preparing protein powdered milk for infant feeding purposes, which when reliquefied may be boiled without curdling, which consists in boiling milk for about one minute and treating the same with a curdling agent to form whey and curd, draining the curd, mixing the curd with acid milk, then increasing the temperature of the mixture until its coagulable properties have been destroyed, then cooling and spray drying the product.

9. The process of preparing powdered protein milk for infant feeding purposes, which when reliquefied may be boiled without curdling, which consists in boiling milk for about one minute and treating the same with a curdling agent to form whey and curd, draining the curd, mixing the curd with acid milk, homogenizing the mixture, then rapidly increasing the temperature of the mixture to substantially the boiling point thereof until its coagulable properties have been destroyed, cooling the same, and then spray drying the product.

10. The process of preparing powdered protein milk for infant feeding purposes, which when reliquefied may be boiled without curdling, which consists in boiling milk for about one minute and treating the same with a curdling agent to form whey and curd, draining the curd, mixing the curd with acid milk, homogenizing the mixture, then rapidly increasing the temperature of the mixture to substantially the boiling point thereof until its coagulable properties have been destroyed, rapidly cooling the same, again homogenizing the mixture and then spray drying the product.

11. The process of preparing powdered protein milk for infant feeding purposes, which when reliquefied may be boiled without curdling, which consists in boiling milk for about one minute, adding a curdling agent thereto to precipitate the curd, allowing the curd to settle, drawing off the whey and draining the curd, adding skim milk which has been acidified by adding lactic acid to raise the acidity to approximately .75% to the curd, homogenizing the mixture, increasing the temperature to destroy the coagulable properties of and to sterilize the mixture, agitating the same during the heat treatment, again homogenizing the mixture and then spray drying it in its dilute state.

12. As a new article of manufacture, a powdered protein milk product made from curd and acidified milk and in which the coagulable property of the casein has been largely destroyed, the curd being derived from two parts of whole milk and the acidified milk from one part of skim milk, the curd being in a finely divided state, said powdered product being suitable when reliquefied for infant feeding purposes, and capable of being boiled without curdling and without changing color.

In testimony, that we claim the foregoing as our invention we affix our signatures, this 9th day of April, 1928.

LAMBERT D. JOHNSON.
NATHAN F. TRUE.